United States Patent
Shin et al.

[11] Patent Number: 5,850,274
[45] Date of Patent: Dec. 15, 1998

[54] LIQUID CRYSTAL DISPLAY WITH FOUR-DOMAIN PIXEL AND METHODS OF FABRICATION THEREFOR

[75] Inventors: Sung-Tae Shin; Jae-Jin Lyu, both of Kyungki-do, Rep. of Korea

[73] Assignee: Samsung Electronics Co., Ltd., Suwon, Rep. of Korea

[21] Appl. No.: 774,506

[22] Filed: Dec. 30, 1996

[30] Foreign Application Priority Data

Dec. 28, 1995 [KR] Rep. of Korea ................. 95-61871

[51] Int. Cl.⁶ ........................................ G02F 1/1337
[52] U.S. Cl. .................... 349/129; 349/126; 349/132; 349/135
[58] Field of Search ................. 349/129, 126, 349/123, 132, 135

[56] References Cited

U.S. PATENT DOCUMENTS

| | | | |
|---|---|---|---|
| 5,280,375 | 1/1994 | Tsuda et al. | 349/129 |
| 5,473,455 | 12/1995 | Koike et al. | 349/132 |
| 5,504,604 | 4/1996 | Takatori et al. | 349/123 |

FOREIGN PATENT DOCUMENTS

| | | | |
|---|---|---|---|
| 6-222365 | 8/1994 | Japan | 349/126 |

*Primary Examiner*—William L. Sikes
*Assistant Examiner*—Julie Ngo
*Attorney, Agent, or Firm*—Myers Bigel Sibley & Sajovec

[57] ABSTRACT

A liquid crystal display (LCD) includes first and second LCD panels in an opposed relationship defining a space therebetween. A respective one of the first and second LCD panels includes a substrate and two alignment layers on the substrate. A plurality of alignment regions are formed on the alignment layers which define a plurality of pixel areas, a respective one of the pixel areas having a first alignment surface on a first alignment region, the first alignment surface being operative to align molecules of a liquid crystal material in contact therewith toward a first direction, and a second alignment surface on an exposed portion of the second alignment layer disposed laterally adjacent the first alignment region, the second alignment region being operative to align molecules of the liquid crystal material in contact therewith toward a second direction opposite the first direction. The liquid crystal material is disposed in the space between the first and second LCD panels, in contact with the first and second alignment surfaces. The first and second LCD panels are arranged in an opposed relationship such that a respective pixel area of the first LCD panel opposes a respective pixel area of the second LCD panel and such that each of the first and second alignment surfaces of a respective pixel area of the first LCD panel confronts both first and second alignment surfaces of a respective opposing pixel area of the second LCD panel to define four domains. Preferably, the alignment layers and the plurality of alignment regions are polystyrene. The alignment layers and the plurality of alignment regions may be formed of a polystyrene having a para-oriented benzene ring structure which may include an unsaturated or saturated alkyl group.

12 Claims, 5 Drawing Sheets

FIG.7C

LIQUID CRYSTAL DISPLAY WITH FOUR-DOMAIN PIXEL AND METHODS OF FABRICATION THEREFOR

FIELD OF THE INVENTION

The present invention relates to liquid crystal displays and methods of fabrication therefor, more particularly, to liquid crystal displays with multi-domain pixels and methods of fabrication therefor.

BACKGROUND OF THE INVENTION

To meet more demanding multimedia and other graphics-intensive applications, a variety of technologies have been proposed to overcome narrow and nonuniform viewing angle characteristics of liquid crystal displays (LCDs). Approaches for improving these characteristics include multi-domain pixel structures, in-plane switching and the like.

Figure 1A:
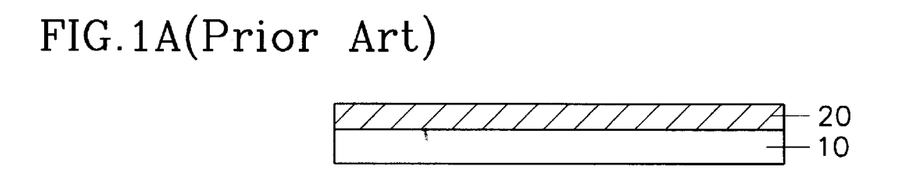
FIGS. 1A–1F are cross-sectional views of intermediate fabrication products illustrating a conventional technique for fabricating a multi-domain pixel.
Figure 1B:
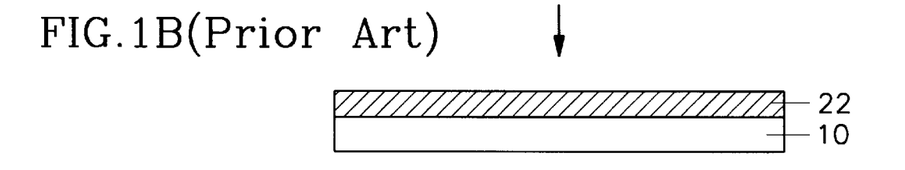
Figure 1C:
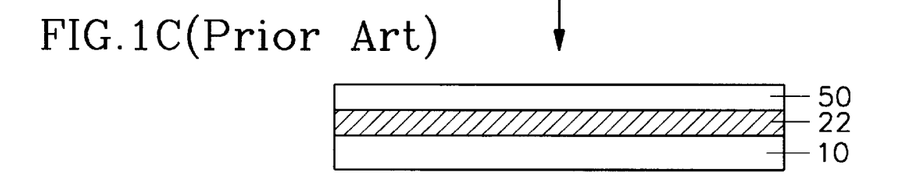
Figure 1D:
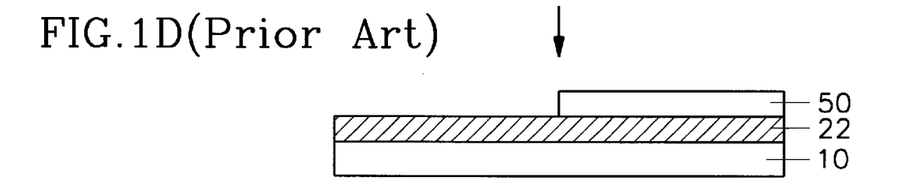
Figure 1E:
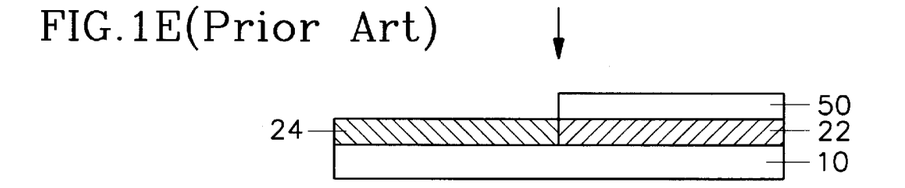
Figure 1F:
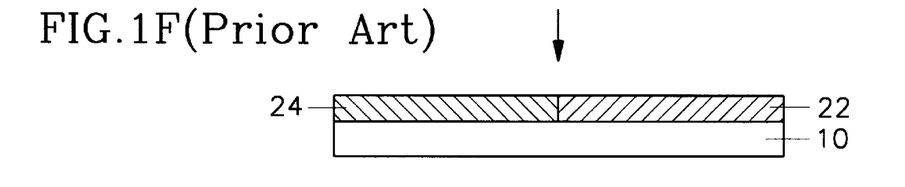

Well-known techniques for improving viewing angle of LCDs include four-domain pixel fabrication techniques. A conventional technique for fabricating an LCD panel having four-domain pixels includes two rubbing processes and a single photolithography process, as illustrated in FIGS. 1A–1F. An alignment film 22 is formed on a substrate 10. The alignment film 22 is rubbed along a first direction as shown in FIG. 1B. A photoresist layer 50 is then formed on the alignment layer 22 as shown in FIG. 1C, and then the photoresist layer 50 is exposed to light and developed to expose a portion of the alignment layer 22, as shown in FIG. 1D. The exposed portion of the alignment layer 22 is then rubbed along a second direction opposite to the first direction, as illustrated by FIG. 1E. The remainder of the photoresist layer 50 is then removed, as shown by FIG. 1F.

Figure 2A:
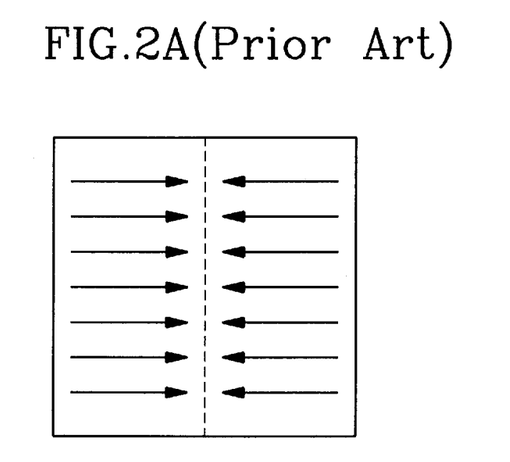
FIGS. 2A–2C are plan views illustrating LCD panels arranged according to a convention technique for fabricating a multi-domain pixel.
Figure 2B:
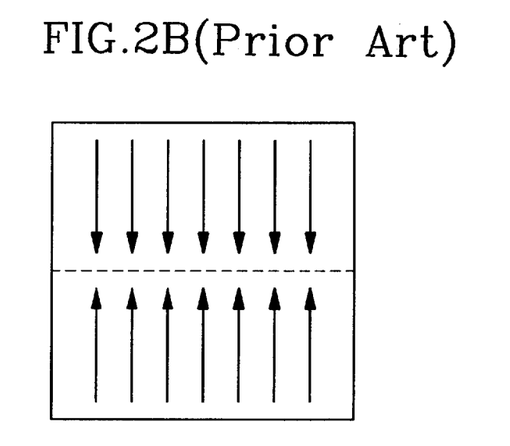
Figure 2C:
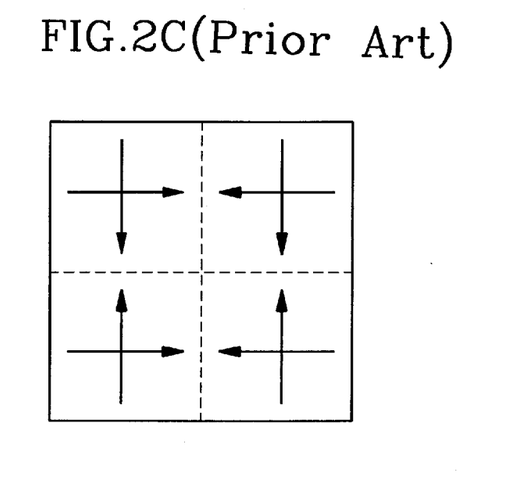

FIG. 2A illustrates a first LCD panel, e.g., a thin-film transistor (TFT) substrate, in which each pixel is divided into two subpixels. FIG. 2B illustrates a second LCD panel, e.g., a color filter substrate, which similarly has a pixel divided into two subpixels. When attached in an opposing relationship such that each of the subpixels confronts both subpixels of the opposing pixel, the combination of alignment directions produces four domains for the pixel, as illustrated in FIG. 2C.

The four-domain pixel structure can improve the viewing angle characteristics of the display. However, the two rubbing processes employed for producing the alignment layer can introduce levels of impurities which can yield to poor yields in fabrication of the display panels.

SUMMARY OF THE INVENTION

In light of the foregoing, it is an object of the present invention to provide multi-domain liquid crystal displays (LCDs) and methods of fabrication therefor which can be fabricated with fewer impurities and higher yields.

This and other objects, features and advantages are provided according to the present invention by LCDs and methods of fabrication therefor in which pixel areas are formed on first and second LCD panels, each pixel including a first alignment surface on an alignment layer and a second alignment surface on an alignment region disposed on the alignment layer. The first alignment surface is operative to align molecules of a liquid crystal material toward a first direction, and the second alignment surface is operative to align molecules of the liquid crystal material towards a second direction, preferably opposite the first direction. Four domains are formed by attaching the LCD panels in an opposed relationship such that the first and second alignment surfaces of a pixel area of one LCD panel confront both first and second alignment surfaces of an opposed pixel area of the other LCD panel. The liquid crystal material is disposed in a space defined between the first and second LCD panels.

By using alignment surfaces on separate regions, the present invention provides an LCD panel with multi-domain pixels which can be fabricated without requiring multiple rubbings of the alignment surfaces. Accordingly, the amount of impurities which are introduced can be reduced, leading to potentially higher fabrication yields.

In particular, according to the present invention, a liquid crystal display (LCD) includes first and second LCD panels in an opposed relationship defining a space therebetween. A respective one of the first and second LCD panels includes a substrate and an alignment layer on the substrate. A plurality of alignment regions are formed on the alignment layer which define a plurality of pixel areas. A respective one of the pixel areas has a first alignment surface on an alignment region, the first alignment surface being operative to align molecules of a liquid crystal material in contact therewith toward a first direction, and a second alignment surface on an exposed portion of the alignment layer disposed laterally adjacent the alignment region, the second alignment region being operative to align molecules of the liquid crystal material in contact therewith toward a second direction. The liquid crystal material is disposed in the space between the first and second LCD panels, in contact with the first and second alignment surfaces. The first and second LCD panels are arranged in an opposed relationship such that a respective pixel area of the first LCD panel opposes a respective pixel area of the second LCD panel and such that each of the first and second alignment surfaces of a respective pixel area of the first LCD panel confronts both first and second alignment surfaces of a respective opposing pixel area of the second LCD panel to define four domains. Preferably, the alignment layer and the plurality of alignment regions comprise polystyrene, preferably a polystyrene having a para-oriented benzene ring structure which may include an unsaturated or a saturated alkyl group.

The plurality of pixel areas may include a plurality of rectangular pixel areas. According to first and second embodiments, the first and second alignment surfaces are triangular and the first and second LCD panels are arranged such that each of the first and second triangular alignment surfaces of the rectangular pixel area of the first LCD panel confronts both first and second triangular alignment surfaces of the opposing rectangular pixel area of the second LCD panel to thereby define four triangular domains. According to third and fourth embodiments, the first and second alignment surfaces are rectangular and the first and second LCD panels are arranged such that each of the first and second rectangular alignment regions of the pixel area of the first LCD panel confronts both first and second rectangular alignment regions of the opposing rectangular pixel area of the second LCD panel to thereby define four rectangular domains.

According to method aspects of the invention, an LCD display panel may be formed by forming an alignment layer on a substrate and forming a plurality of alignment regions on the alignment layer to thereby define plurality of pixel areas, a respective one of the pixel areas having a first alignment surface on an alignment region and a second alignment surface on an exposed portion of the alignment layer disposed adjacent the first surface. The pixel areas may be treated to render the first alignment surface operative to align molecules of a liquid crystal material in contact therewith toward a first direction and to render the adjacent second alignment d surface of the alignment region operative to align molecules of the liquid crystal material in contact therewith towards a second direction opposite of the first direction. The plurality of alignment regions may be formed by forming a second alignment layer on the first alignment layer and patterning the second alignment layer to form the plurality of alignment regions. According to first and second method aspects, a plurality of triangular alignment regions are formed on the alignment layer to thereby define a plurality of rectangular pixel areas, a respective one of the rectangular pixel areas having a first triangular alignment surface on an alignment region and a second triangular alignment surface on an exposed portion of the alignment layer disposed adjacent the first triangular alignment surface. According to third and fourth method aspects, a plurality of rectangular alignment regions is formed on the alignment layer to thereby define a plurality of rectangular pixel areas, a respective one of the rectangular pixel areas having a first rectangular alignment surface on an alignment region and a second rectangular alignment surface on an exposed portion of the alignment layer disposed adjacent the first rectangular alignment surface. The alignment regions may be formed by rubbing the first alignment surface along a third direction perpendicular to the first direction and by rubbing the second alignment surface along a fourth direction perpendicular to the second direction.

According to other method aspects, an LCD may be formed by forming first LCD panel and a second LCD panel. A respective one of the first and second LCD panels includes a substrate, an alignment layer on the substrate, and a plurality of alignment regions on the alignment layer which define a plurality of pixel areas. A respective one of the pixel areas has a first alignment surface on an alignment region, the first alignment surface being operative to align molecules of a liquid crystal material in contact therewith toward a first direction, and a second alignment surface on an exposed portion of the alignment layer disposed laterally adjacent the alignment region, the second alignment region being operative to align molecules of the liquid crystal material in contact therewith toward a second direction. The first and second LCD panels are attached in an opposed relationship to define a space therebetween, the first and second LCD panels being arranged such that a respective pixel area of the first LCD panel opposes a respective pixel area of the second LCD panel and such that each of the first and second alignment regions of a respective pixel area of the first LCD panel confronts both first and second alignment regions of a respective opposing pixel area of the second LCD panel to define four domains. The liquid crystal material is placed in the space defined between the first and second LCD panels to contact the first and second alignment regions.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity, and like numbers refer to like elements throughout.

Generally, a polyimide alignment film as is conventionally used in liquid crystal displays (LCDs) has the characteristic that liquid crystal molecules contacting the alignment film are aligned towards the direction along which the film is rubbed. A polystyrene alignment film generally has the characteristic that liquid crystal molecules contacting the alignment film are typically aligned perpendicularly with respect to the rubbing direction.

A conventional polystyrene alignment layer typically produces a pretilt angle of 0–10 degrees. According to a preferred embodiment of the present invention, two polystyrene alignment surfaces are provided in a pixel area, each formed from a polystyrene which has a para-oriented benzene ring structure. The para-oriented benzene ring structure may include a saturated alkyl group or an unsaturated alkyl group. A first one of the alignment surfaces is rubbed in one direction to render the surface operative to align molecules of a liquid crystal material toward a first direction perpendicular to the rubbing direction, while the other alignment surface is rubbed in another direction, preferably opposite the direction the first surface is rubbed, rendering it operative to align molecules of the liquid crystal material toward a second direction, preferably opposite the first direction.

Figure 3A:
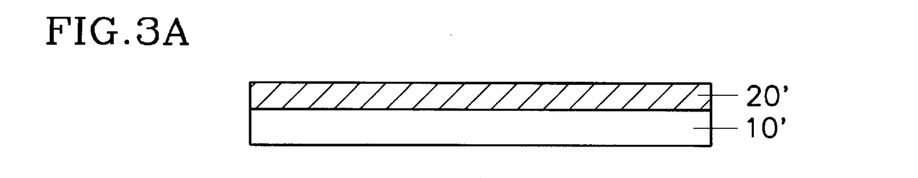
FIGS. 3A–3F are cross-sectional views of intermediate fabrication products illustrating operations for fabricating an LCD panel according to the present invention.
Figure 3B:
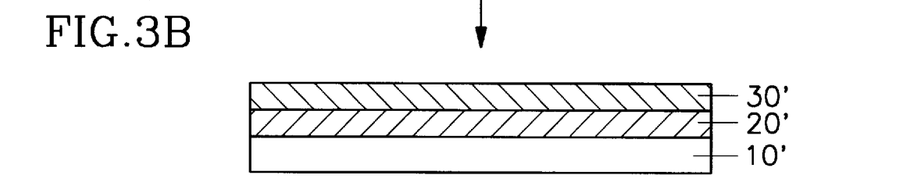
Figure 3C:
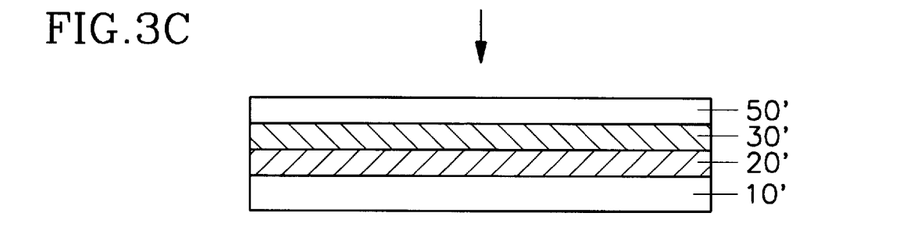
Figure 3D:
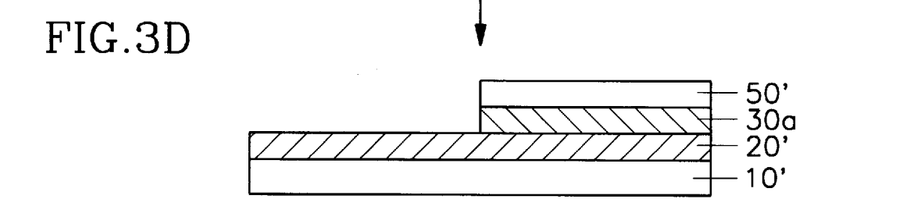
Figure 3E:
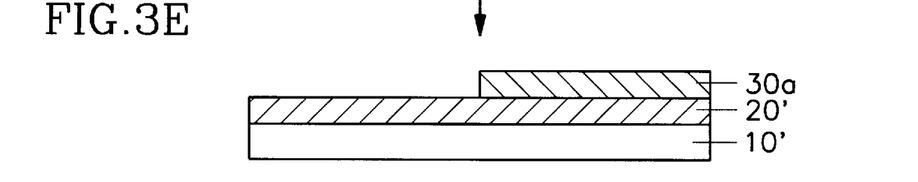
Figure 3F:
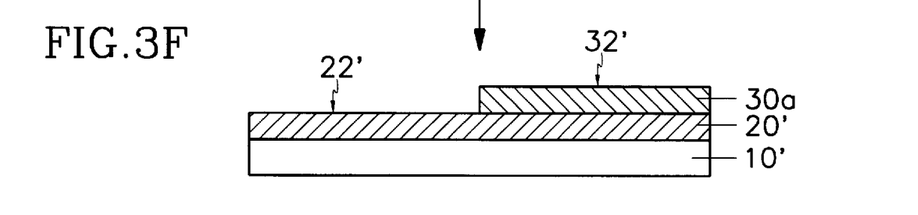

FIGS. 3A–3F depict operations for fabricating an LCD panel according to the present invention, in particular, operations for forming alignment surfaces of a pixel area according to the present invention. A first alignment layer 20', preferably polystyrene, is formed on a substrate 10'. As illustrated in FIG. 3B, a second alignment layer 30', also preferably polystyrene, is formed on the first alignment layer 20'. A photoresist layer 50' is then formed on the second alignment layer 30', as illustrated in FIG. 3C. The second alignment layer 30' is then patterned by irradiating the structure with ultraviolet rays, selectively developing the photoresist layer 50' and then removing portions of the photoresist layer 50' and the underlying second alignment layer 30' to form an alignment region 30a on the first alignment layer 20', as shown in FIG. 3D. As illustrated in FIG. 3E, the remaining portion of the photoresist layer 50' is then removed. A first alignment surface 22' is formed on the exposed portion of the first alignment layer 20' and a second alignment surface 32' is formed on an alignment region 30a formed from the second alignment layer 30' by rubbing these surfaces in opposite directions.

Figure 4A:
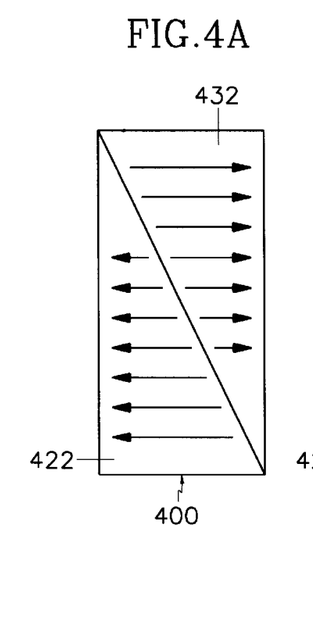
FIGS. 4A–4C, 5A–5C, 6A–6C, and 7A–7C are plan views illustrating LCD panels and operations for arrangement thereof to form multi-domain pixels according to the present invention.
Figures 4B, 4C:
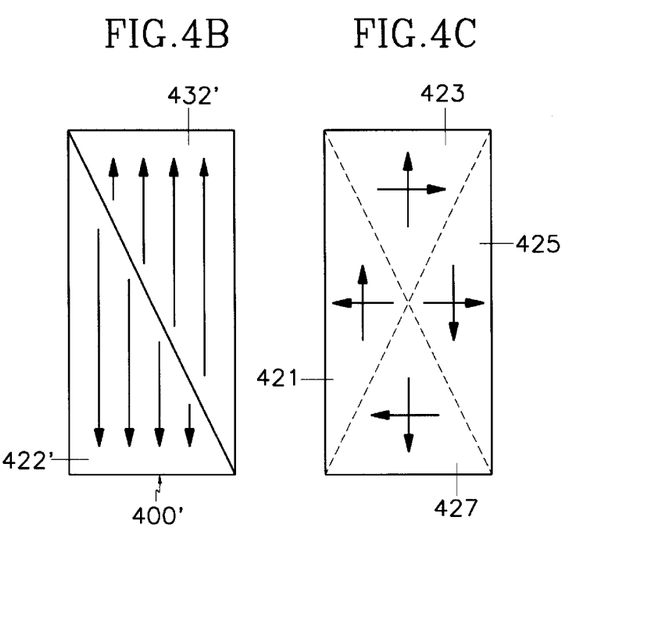
Figure 5A:
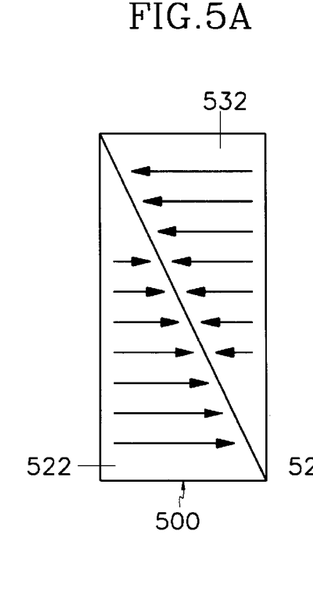
Figures 5B, 5C:
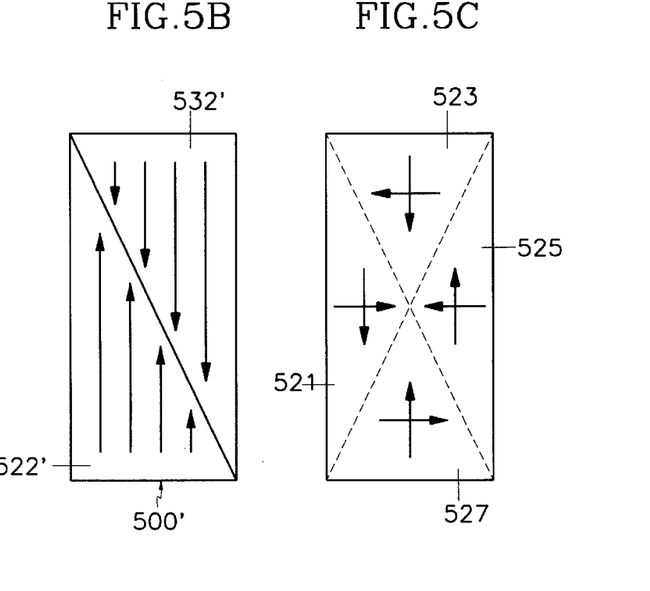

FIGS. 4A–4C, 5A–5C, 6A–6C and 7A–7C illustrate various ways in which the alignment surfaces may be formed to produce various domain patterns in a pixel area of a liquid crystal display. As illustrated in FIGS. 4A–4C, a first embodiment includes triangular alignment surfaces 422, 432 formed on either side of a diagonal bisecting a pixel area 400 of a first LCD panel, e.g., a thin-film transistor (TFT) substrate or a color filter substrate. Similar triangular alignment surfaces 422', 432' may be formed on either side of a diagonal bisecting a pixel area 400' of a second LCD panel, with the arrows indicating the respective alignment directions of the alignment surfaces. When the LCD panels are arranged in an opposed relationship such that the each of the alignment surfaces 422, 432 confronts both alignment surfaces 422', 432' of the opposing panel, four triangular domains 421, 423, 425, 427 may be formed. A similar arrangement is provided for the second embodiment illustrated in FIGS. 5A–5C, except that the alignment regions 522, 532, 522', 532' of the pixel areas 500, 500' are rubbed to align liquid crystal molecules in opposite directions to the counterpart alignment surfaces depicted in FIGS. 4A–4C, producing four triangular domains 521, 523, 525, 527 in a liquid crystal material disposed between the panels, in contact with the alignment surfaces.

Figure 6A:
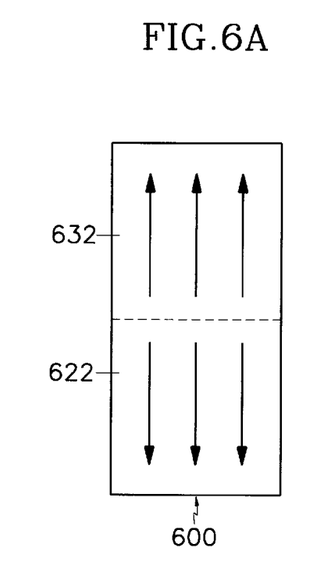
Figure 6B:
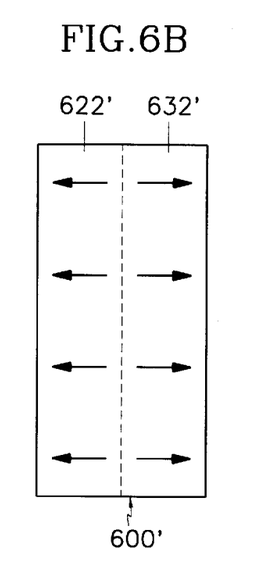
Figure 6C:
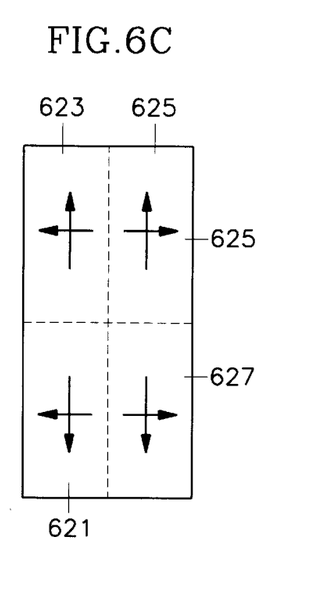
Figure 7A:
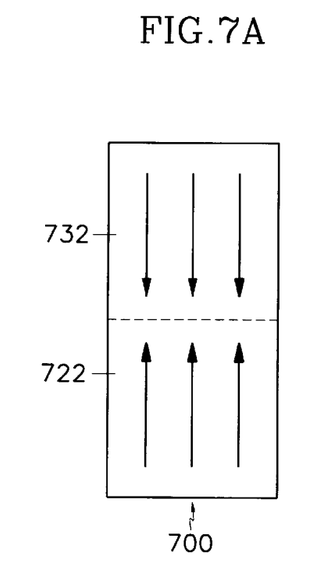
Figure 7B:
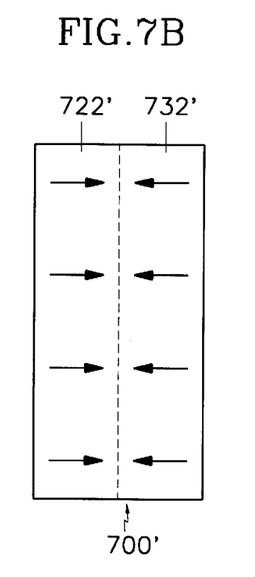
Figure 7C:
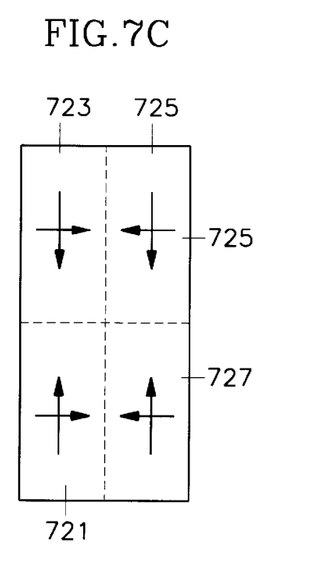

Other possible embodiments are illustrated in FIGS. 6A–6C and 7A–7C. In FIGS. 6A–6C, rectangular alignment surfaces 622, 632 may be formed on either side of a line bisecting a pixel area 600 of a first LCD panel, and similar rectangular alignment surfaces 622', 632' may be formed on either side of a line bisecting a pixel area 600' of a second LCD panel, with the arrows indicating the respective alignment directions of the alignment surfaces. When the LCD panels are arranged in an opposed relationship such that the each of the alignment surfaces 622, 632 confronts both alignment surfaces 622', 632' of the opposing panel, four rectangular domains 621, 623, 625, 627 may be formed. A similar arrangement is illustrated in FIGS. 7A–7C, except that the alignment regions 722, 732, 722', 732' of the pixel areas 700, 700' are aligned in opposite directions to their counterparts in FIGS. 6A–6C, producing four rectangular domains 721, 723, 727, 727 in a liquid crystal material disposed between the panels, in contact with the alignment surfaces.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of forming a panel for a liquid crystal display (LCD), the method comprising the steps of:
    forming a first alignment layer on a substrate;
    forming a second alignment layer on the first alignment layer;
    removing a portion of the second alignment layer to thereby define a pixel area having a first alignment surface on the second alignment layer and a second alignment surface, on an exposed portion of the first alignment layer, disposed adjacent the first alignment surface; and
    rubbing the first and second alignment surfaces in first and second opposite directions.

2. A method according to claim 1, wherein said step of forming a first alignment layer comprises the step of forming a first polystyrene layer on the substrate, and wherein said step of forming a second alignment layer comprises the step of forming a second polystyrene layer on the first polystyrene layer.

3. A method according to claim 2, wherein the first and second polystyrene layers are formed from a polystyrene having a para-oriented benzene ring structure.

4. A method according to claim 3, wherein a functional group of the para-oriented benzene ring structure comprises one of a saturated alkyl group and an unsaturated alkyl group.

5. A method according to claim 1, wherein said step of removing a portion of the second alignment layer to thereby define a pixel area comprises the step of removing a portion of the second alignment layer to thereby define a triangular pixel area having a first triangular alignment surface on the second alignment layer and a second triangular alignment surface on an exposed portion of the first alignment layer disposed adjacent the first triangular alignment surface.

6. A method according to claim 1, wherein said step of removing a portion of the second alignment layer to thereby define a pixel area comprises the step of removing a portion of the second alignment layer to thereby define a rectangular pixel area having a first rectangular alignment surface on the second alignment layer and a second rectangular alignment surface on an exposed portion of the first alignment layer disposed adjacent the first rectangular alignment surface.

7. A method of fabricating a liquid crystal display (LCD), the method comprising the steps of:
    forming a first LCD panel and a second LCD panel, wherein a respective one of said first and second panels are formed by:
        forming a first alignment layer on a substrate;
        forming a second alignment layer on the first alignment layer;
        removing a portion of the second alignment layer to thereby define a pixel area having a first alignment surface on the second alignment layer and a second alignment surface on an exposed portion of the first alignment layer disposed adjacent the first alignment surface; and
        rubbing the first and second alignment surfaces in first and second opposite directions;
    attaching the first and second LCD panels in an opposed relationship to define a space therebetween, the first and second LCD panels being arranged such that a respective pixel area of the first LCD panel opposes a respective pixel area of the second LCD panel and such that each of the first and second alignment surfaces of a respective pixel area of the first LCD panel confronts both first and second alignment surfaces of a respective opposing pixel area of the second LCD panel to define four domains; and
    placing a liquid crystal material in the space defined between the first and second LCD panels to contact the first and second alignment surfaces.

8. A method according to claim 7, wherein said step of forming a first alignment layer comprises the step of forming a first polystyrene layer on the substrate, and wherein said step of forming a second alignment layer comprises the step of forming a second polystyrene layer on the first polystyrene layer.

9. A method according to claim 8, wherein the first and second polystyrene layers are formed from a polystyrene having a para-oriented benzene ring structure.

10. A method according to claim 9, wherein a functional group of the para-oriented benzene ring structure comprises one of a saturated alkyl group and an unsaturated alkyl group.

11. A method according to claim 7, wherein said step of removing a portion of the second alignment layer to thereby define a pixel area comprises the step of removing a portion of the second alignment layer to thereby define a triangular pixel area having a first triangular alignment surface on the second alignment layer and a second triangular alignment surface on an exposed portion of the first alignment layer disposed adjacent the first triangular alignment surface.

12. A method according to claim 7, wherein said step of removing a portion of the second alignment layer to thereby define a pixel area comprises the step of removing a portion of the second alignment layer to thereby define a rectangular pixel area having a first rectangular alignment surface on the second alignment layer and a second rectangular alignment surface on an exposed portion of the first alignment layer disposed adjacent the first rectangular alignment surface.

* * * * *

UNITED STATES PATENT AND TRADEMARK OFFICE
CERTIFICATE OF CORRECTION

PATENT NO. : 5,850,274

DATED : December 15, 1998

INVENTOR(S) : Sung-Tae Shin; Jae-Jin Lyu

It is certified that error appears in the above-identified patent and that said Letters Patent is hereby corrected as shown below:

In the Title:
Delete "Display" and substitute -- Displays -- therefor
Delete "Pixel" and substitute -- Pixels -- therefor.

In the Abstract:
Line 15    Add -- to -- following "opposite"

In the Claims:
Column 5, Line 54    Delete the "," following "surface"
Col. 5, line 55, Delete the "," following "layer"

Signed and Sealed this

Twentieth Day of April, 1999

*Attest:*

Q. TODD DICKINSON

*Attesting Officer*    *Acting Commissioner of Patents and Trademarks*